United States Patent [19]

Brimaud

[11] 4,168,767
[45] Sep. 25, 1979

[54] CALIPER BRAKE WITH A HOLLOW CYLINDRICAL BRAKING MEMBER

[75] Inventor: Gilbert J. Brimaud, Paris, France

[73] Assignee: Societe Anonyme Francaise du Ferodo, Paris, France

[21] Appl. No.: 919,604

[22] Filed: Jun. 27, 1978

[30] Foreign Application Priority Data

Jul. 1, 1977 [FR] France .................. 77 20259

[51] Int. Cl.² .................................. F16D 53/00
[52] U.S. Cl. ........................... 188/76; 188/73.6
[58] Field of Search ............ 188/73.3, 73.5, 73.6, 188/76

[56] References Cited

U.S. PATENT DOCUMENTS

| | | | |
|---|---|---|---|
| 3,052,327 | 9/1962 | Yazell et al. | 188/76 |
| 3,661,232 | 5/1972 | Kondo | 188/73.6 X |
| 3,933,227 | 1/1976 | de Gennes | 188/76 |

Primary Examiner—Duane A. Reger
Attorney, Agent, or Firm—Charles A. Brown; Charles E. Brown

[57] ABSTRACT

A C-shaped caliper member straddles the hollow cylindrical braking member, a hydraulic actuator and brake shoes on the respective sides of the braking member. To axially retain the caliper member two circumferential, laterally projecting shoulders are provided on the end of the backing plate of at least one of the brake shoe remote from but facing the intermediate portion of the caliper member abutting against flats on the fixed support of the brake, an axial bearing surface extending from the opposite end of the backing plate, and an axial bearing surface on the caliper member or a part associated therewith axially beyond the first mentioned axially bearing surface, the axial bearing surfaces being cooperable with a removable retaining pin.

22 Claims, 26 Drawing Figures

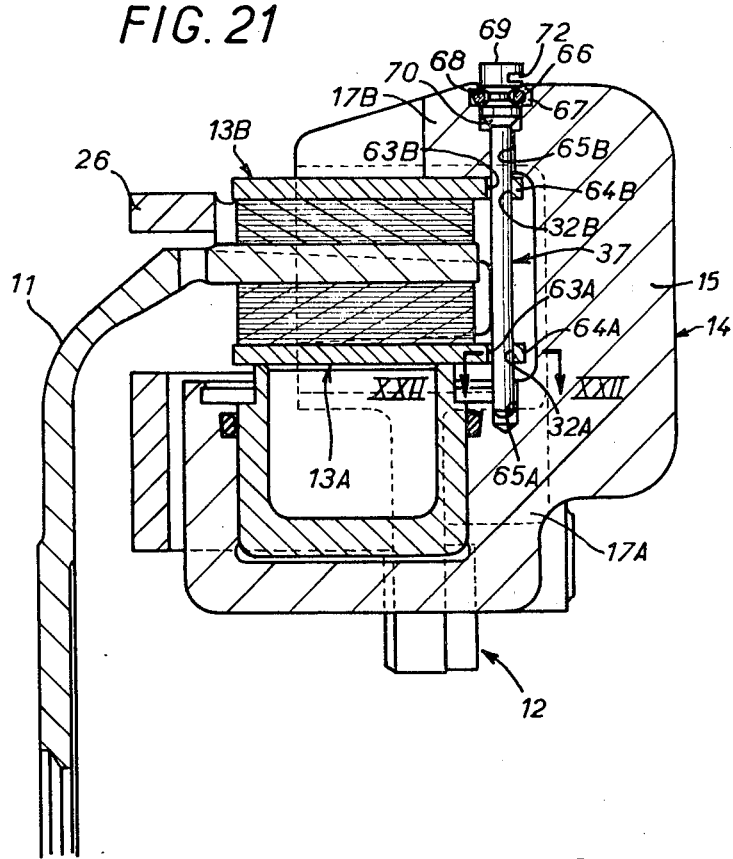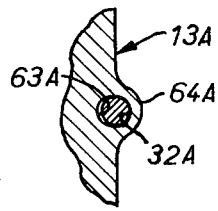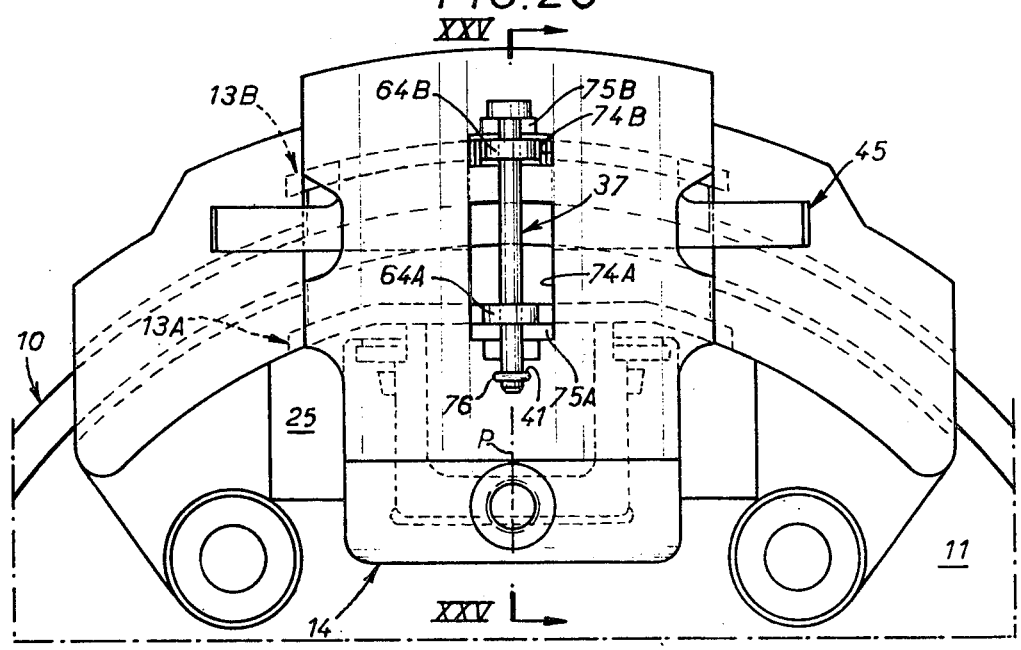

CALIPER BRAKE WITH A HOLLOW CYLINDRICAL BRAKING MEMBER

BACKGROUND OF THE INVENTION

The present invention relates generally to brakes of the type having a hollow cylindrical braking member and a caliper member endwise straddling the braking member.

Such a brake usually comprises a fixed support which is adapted to be secured to some sort of supporting member, e.g. the stub axle of a wheel to be braked, the hollow cylindrical rotary braking member, known in France as the "crown," which is adapted to be keyed for rotation with the shaft to be braked, i.e. the axle of the wheel, two brakes shoes, respectively disposed on opposite sides of the cylindrical braking member and actuating means adapted to act on said brake shoes for urging them against the braking member in a generally radial direction relative to the cylindrical braking member, referred to as the gripping axis, extending through the central zones of the brake shoes.

The present invention relates more particularly to the use of a generally C-shaped caliper member which is shiftably mounted for radial movement relative to the braking member and straddles the actuating means, the brake shoes and the caliper member and which comprises a first limb associating it which the actuating means for actuating a first brake shoe and a second limb by which it acts against a second brake shoe for transmitting to it the force applied by the actuating means.

More often, the actuating means are embodied in the caliper or transfer member which thenceforth comprise an actuating member, the actuating means comprising a piston displaceable inside a cylinder in the corresponding limb of the caliper member. Still, it may even be a part independent of the actuating means comprising, for example, two pistons, one acting against a first brake shoe and the other against a corresponding limb of the caliper member.

In either event one of the difficulties to be overcome in the construction of brakes of this type results from the need to insure suitable axial retention of the caliper member while permitting easy access to the brake shoe with a view to their replacement when necessary.

Usually the axial retention of the caliper member is effected by means of a retaining bar which extends substantially perpendicular to an axial plane of the brake containing the gripping axis, the retaining bar having an intermediate portion against which the intermediate portion of the caliper member bears axially and two side branches adapted to permit securement to the fixed support.

Most frequently the securement is effected by means of screws, the retaining bar having at the ends of its side branches, turnover portions with holes for receiving the screws.

Although this arrangement has given and continues to give satisfaction, it has various drawbacks.

First, it is a rather expensive arrangement since it employs screws requiring the tapping of holes in the fixed support for threaded arrangement with the screws.

Further, it is not an entirely reliable arrangement inasmuch as such screws may work loose in use due to vibrations to which brakes are inevitably subjected, absent special means for preventing the unloosening of the screws which further augments the cost of the assembly.

Finally, for access to the brake shoes of such an arrangement the screws effecting the axial retention of the caliper member must be removed, which as an operation, although easy in itself, is not always simple to carry out and may be very time-consuming.

SUMMARY OF THE INVENTION

A general object of the present invention is a brake which permits the foregoing difficulties to be substantially mitigated or even entirely overcome.

According to the invention there is provided a brake of the type including a fixed support, a hollow generally cylindrical rotary braking member, a brake shoe disposed on each side of the cylindrical braking member, actuating means, a generally C-shaped caliper member shiftably mounted for radial movement relative to said braking member and straddling said braking member, said brake shoes and said actuating means, said caliper member comprising first and second limbs interconnected by an intermediate portion, said first limb associated with said actuating means for cooperating with a first said brake shoe and a second limb cooperable with a second said brake shoe, braking force being applied directly by said actuating means and through said caliper member for urging said brake shoes against said braking member, along a gripping axis passing through their central zones, and generally radially of said cylindrical braking member, and the improvement comprising two circumferential shoulders for axially retaining said caliper member laterally projecting from the end of one of said brake shoes axially remote from but facing said intermediate portion of said caliper member, said shoulders abutting against axial abutment flats provided on said fixed support, and an axial bearing surface relatively adjacent said intermediate portion of said caliper member and axially extending from the end of said one brake shoe remote from said circumferential shoulders, and an axial bearing surface associated with said caliper member axially adjacent the said axial bearing surface on said one brake shoe and disposed axially therebeyond relative to said intermediate portion of said caliper member, in combination with a retaining pin emovably mounted between said axial bearing surfaces on said brake shoe and associated with said caliper member.

Thus, according to the invention axial retention of the caliper member is performed by means of the retaining pin through the brake shoes which are in axial bearing relation with the fixed support.

To gain access to the brake shoes it suffices to withdraw the retaining pin to free the caliper member. This manouver is simple and fast as it does not require unscrewing. Further, no tapping of holes in the fixed support is necessitated for axial retention of the caliper member. Accordingly the present brake is particularly economical to manufacture.

Furthermore, it is reliable as no loosening of screws is possible in the course of use.

These and other features and advantages of the present invention will be brought out in the description which follows, given by way of example, with reference to the accompanying diagrammatic drawings.

BRIEF DESCRIPTION OF THE DRAWINGS

FIGS. 19–21 are views similar to those of FIGS. 1–3 for yet another embodiment of the present brake;

FIG. 22 is a fragmentary sectional view according to the embodiment of FIGS. 19–21, taken along the line XXII—XXII in FIG. 21;

FIG. 23 is a rear elevational view in the direction of arrow XXIII in FIG. 23, according to still another embodiment of the invention;

DETAILED DESCRIPTION OF THE PREFERRED EMBODIMENTS

The figures illustrate "crown" brakes which comprise a rotary braking member 10 of generally axially elongated hollow cylindrical configuration. The braking member 10 is carried by a flange 11 fixed to a shaft to be braked (not shown), e.g., the axle of a motor vehicle.

Figure 1:
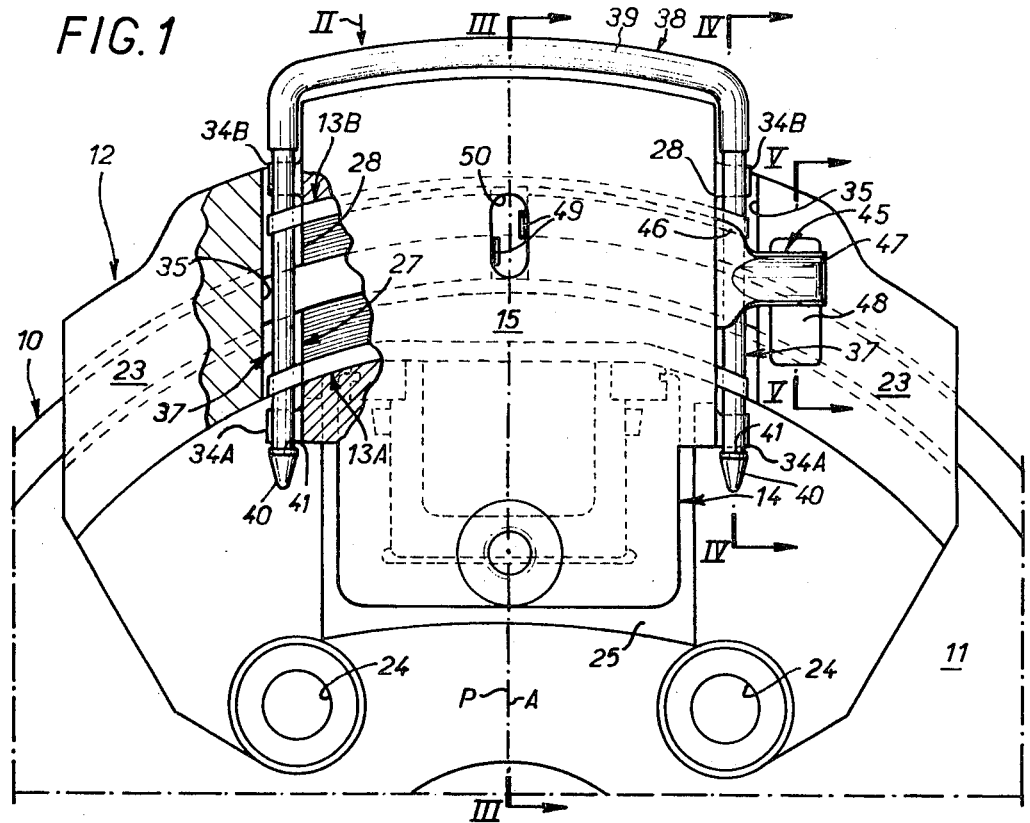
FIG. 1 is a fragmentary elevational view, with a cutaway portion, of a brake embodying the present invention.

In a manner known per se, the brake comprises a fixed support 12, two brake shoes 13A, 13B disposed respectively inside and outside the braking member. The brake shoe 13A cooperates with the inner surface of the cylindrical braking member 10 and the second brake shoe 13B cooperates with the outer surface of the braking member. The brake further comprises a caliper or transfer member 14 of generally C-shape which acts as an actuating member for urging the brake shoes 13A, 13B against the braking member 10 in a generally radial direction A, hereinafter referred to as the gripping axis, extending through the central area of each of the brake shoes. The gripping axis A is represented by dash-dotted line in FIGS. 1 and 3 and shown endwise as a cross in FIG. 2.

In practice, the caliper member 14 straddles the braking member 10 together with the brake shoes 13A, 13B, and for this purpose comprises first and second limbs 17A and 17B interconnected by a intermediate portion 15. The first limb 17A is recessed to define a bore 18 which forms a cylinder for a piston 19 which controls the brake shoe 13A and a second limb 17B which is notched at 20, in the present embodiment, by which it acts against the other brake shoe 13B.

At the rear of piston 19 the cylinder 18 communicates through a threaded port 21 by which it may be coupled to a source of fluid under pressure (not shown).

Likewise in a manner known per se, the fixed support 12 has, in the preferred embodiments, an axial plane of symmetry P through the gripping axis A. This axial plane of symmetry, referred to the axial gripping plane, is represented by a dash-dotted line in FIGS. 1 and 2.

In the illustrated embodiments the fixed support 12 comprises, symmetrically disposed on opposite sides of the axial gripping plane P, two leg portions 23 which straddle with play the braking member 10. The radially innermost ends of the leg portions 23 opposite the braking member 10 form two apertured lugs having apertures 24 for securement to some supporting member (not shown) on the vehicle.

The leg portions are fastened circumferentially together within the confines of the interior of the cylindrical braking member 10 by means of a hangerlike connecting bar 25 skirting the limb 17A of the caliper member 14.

Outside the cylindrical braking member 10 the leg portions 23 are also circumferentially attached to each other by means of a handlelike connecting bar 26.

The leg portions 23 generally form between each other a radial central recess 27 in which the caliper member 14 and the brake shoes 13A, 13B are disposed. The caliper member 14 and the brake shoes 13A, 13B are in sliding engagement between the opposed faces 28 of the leg portions 23 which, parallel to the axial gripping plane P and to each side thereof, laterally delimit the central recess 27.

Figure 2:
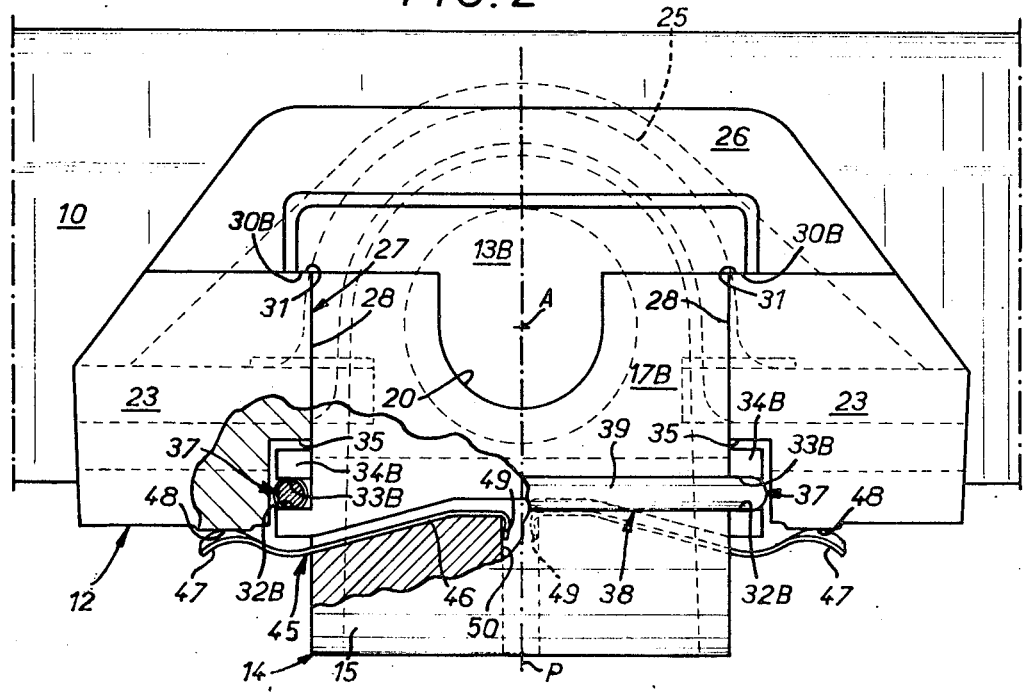
FIG. 2 is a fragmentary plan view, with a cutaway portion, viewed in the direction of arrow II in FIG. 1.
Figure 3:
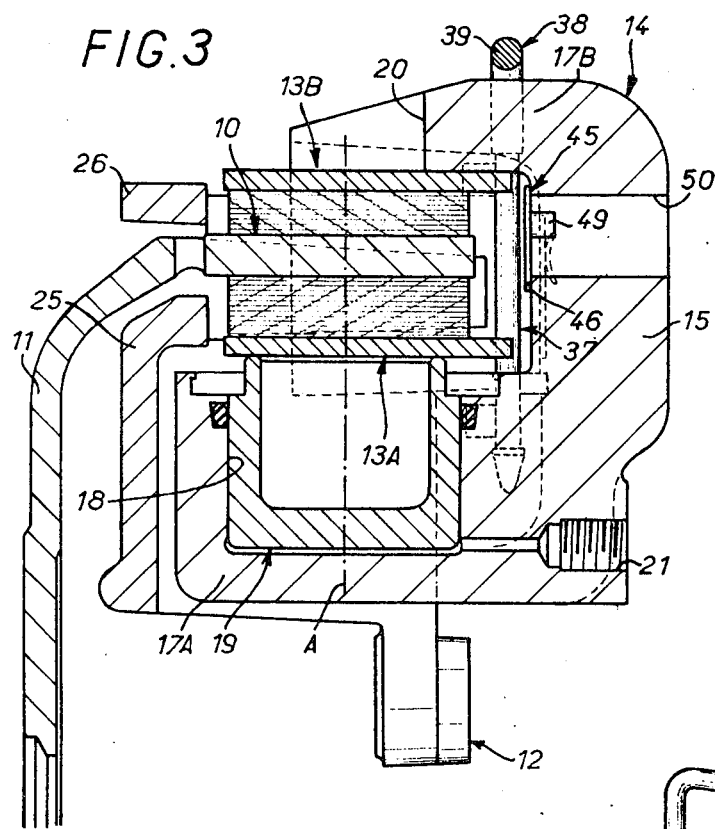
FIG. 3 is a fragmentary axial section, taken of the line III—III in FIG. 3.
Figure 9:
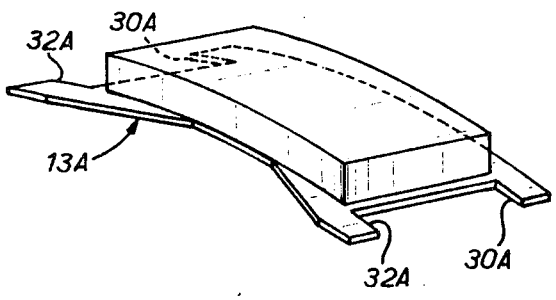
FIG. 9 is a perspective view of a brake shoe of the present brake.
Figure 10:
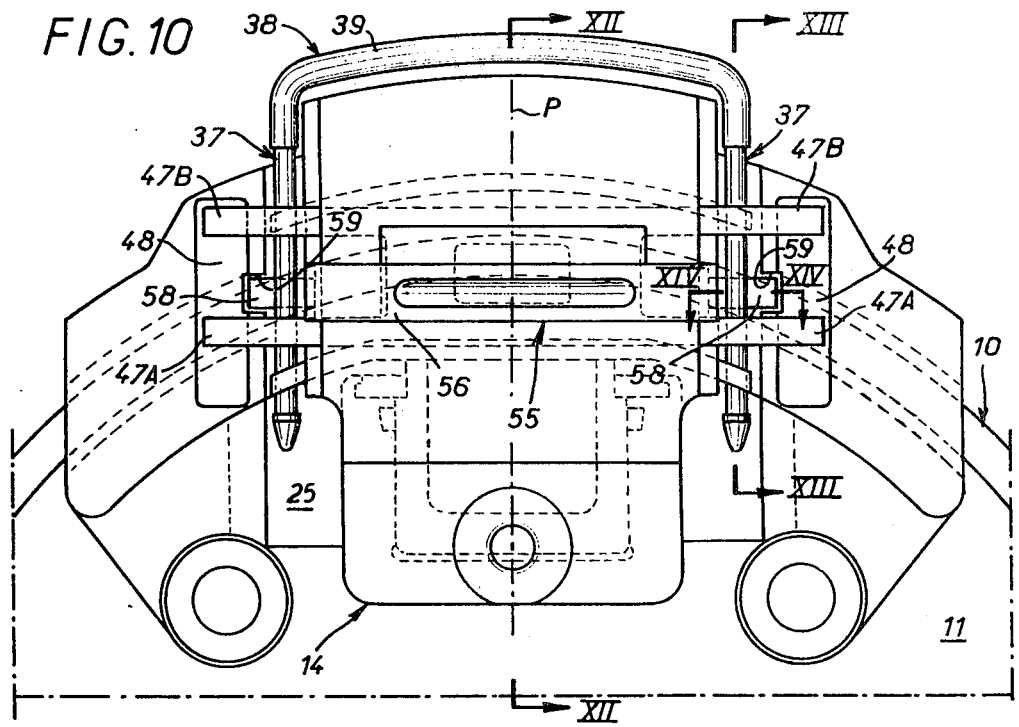
FIGS. 10–13 are view similar to those of FIGS. 1–4 for a modified embodiment of the invention.
Figure 11:
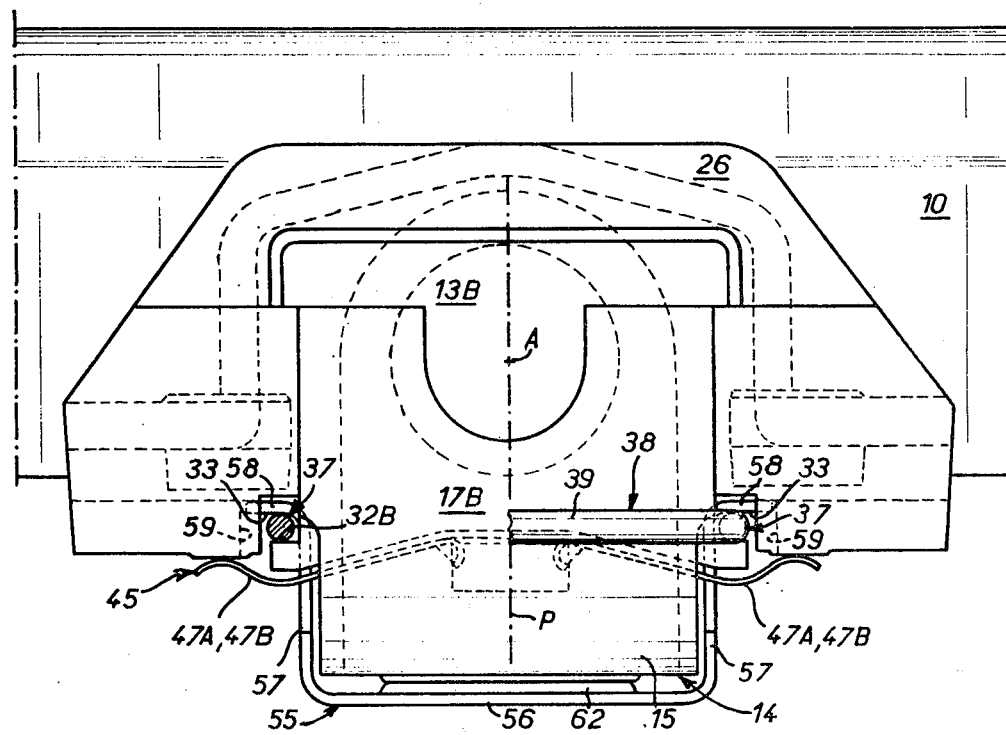
Figure 12:
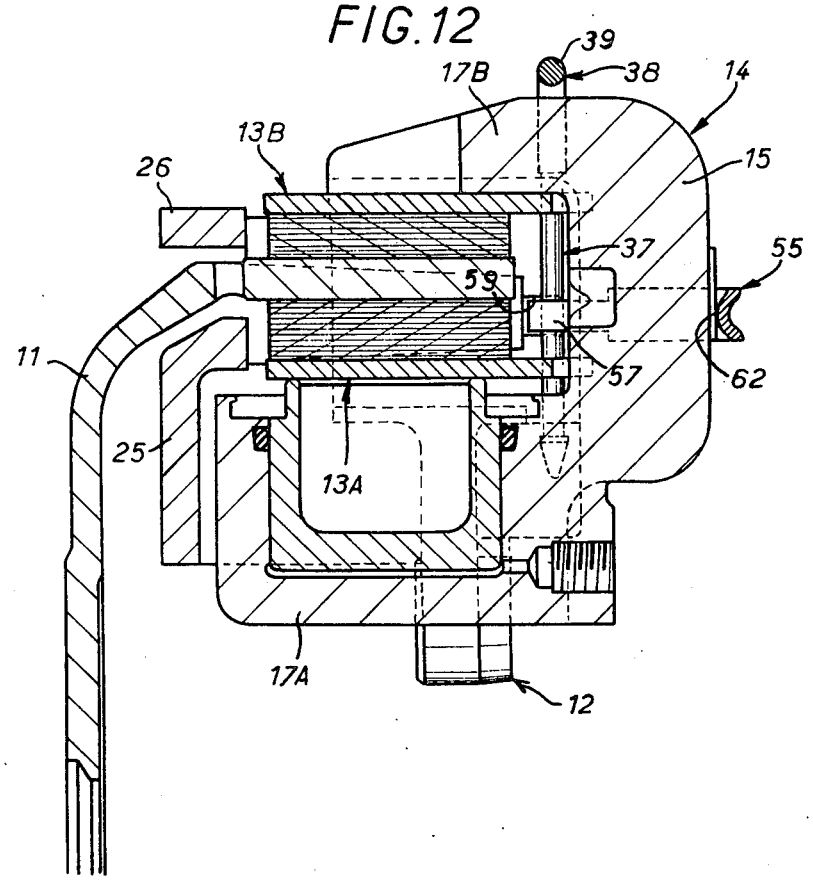
Figure 13:
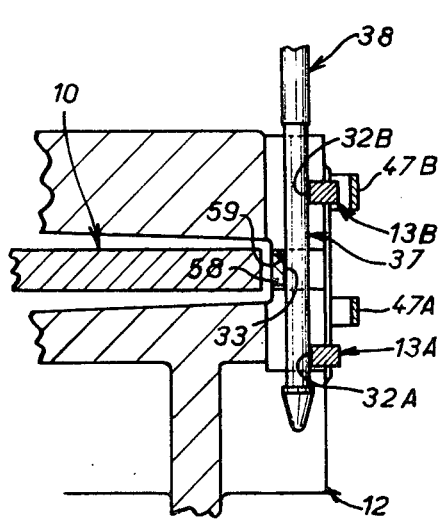
Figure 14:
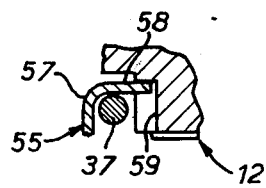
FIG. 14 is a fragmentary cross-sectional view, taken along the line XIV—XIV in FIG. 10.
Figure 15:
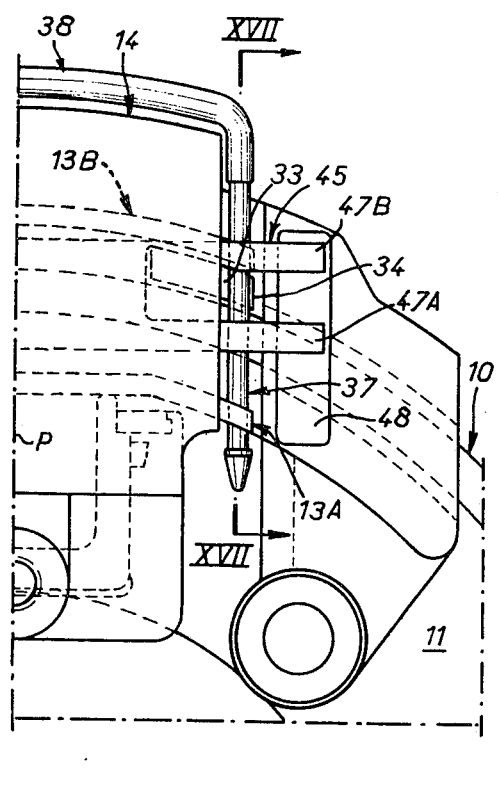
FIG. 15 is an elevational view, similar to that of FIG. 1, but for only half of the brake, according to another embodiment of the invention.
Figure 16:
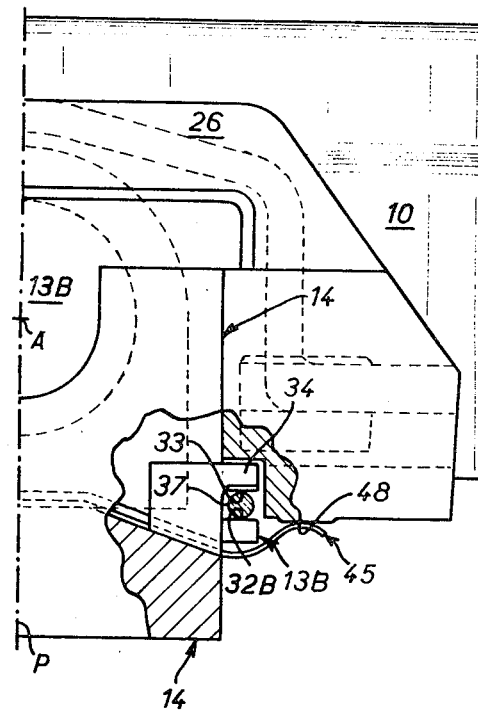
FIG. 16 is a plan view, similar to that of FIG. 2, but for only half of the brake, with a cutaway portion, for the embodiment of FIG. 15.
Figure 17:
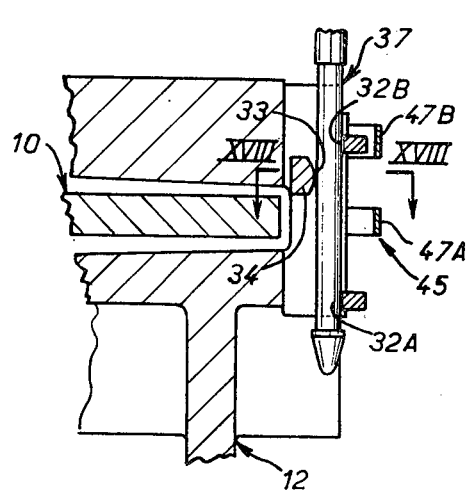
FIG. 17 is a fragmentary sectional view, taken along the line XVII—XVII in FIG. 15.
Figure 18:
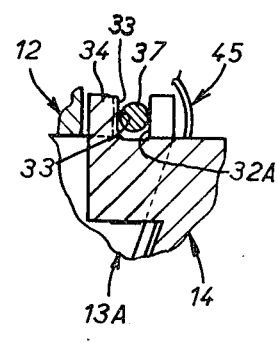
FIG. 18 is another fragmentary sectional view, taken along the line XVII—XVII in FIG. 15.
Figure 19:
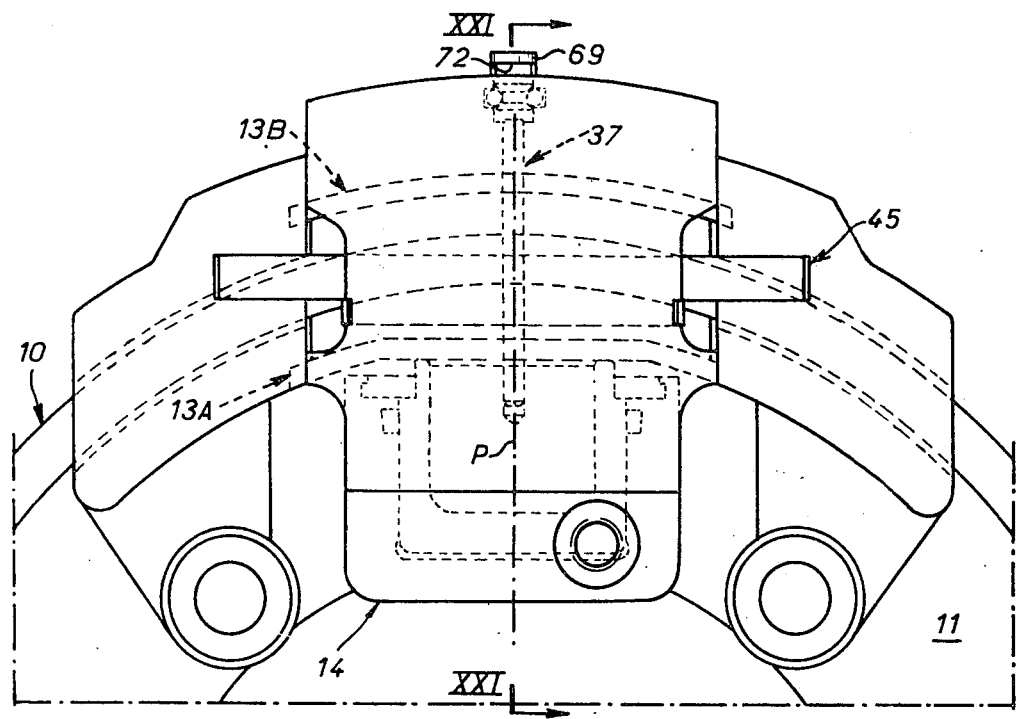
Figure 20:
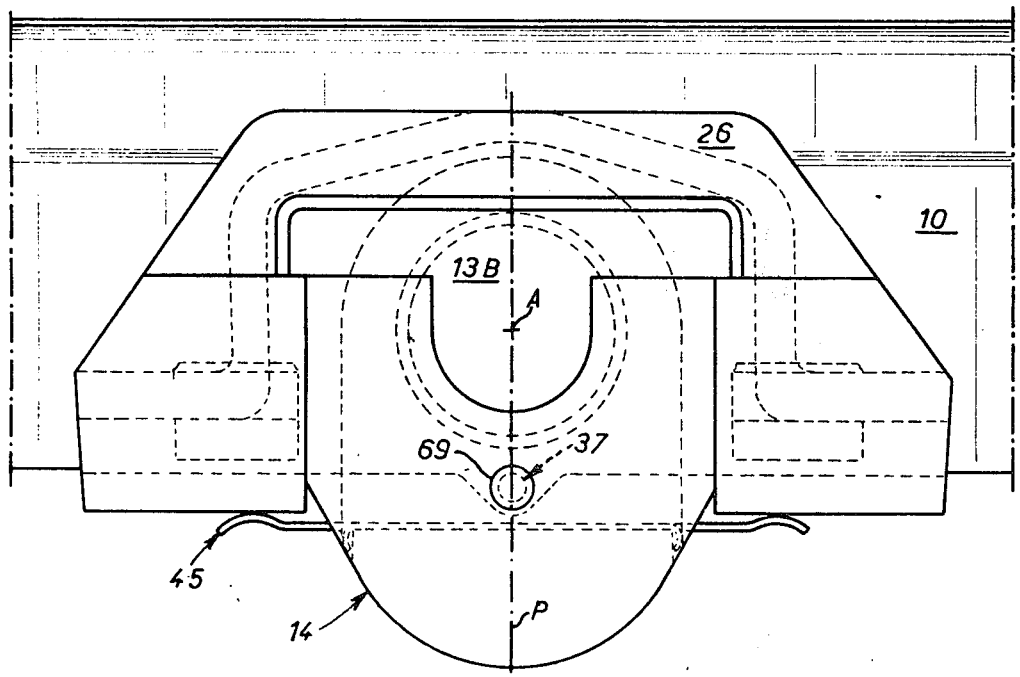

On the end axially remote from the intermediate portion 15 of the caliper member 14 each brake shoe 13A, 13B has laterally projecting circumferential shoulders 30A, 30B which axially face the intermediate portion 15 of the caliper member 14; the shoulders 30A, 30B bear against two axial abutment surfaces 31 provided on the leg portions 23 of the fixed support 12 proximate to the anchoring zone thereof on the connecting bar 26, FIGS. 2 and 9.

The brake shoes 13A, 13B also comprise, adjacent the intermediate portion 15 of the caliper member 14, axial bearing surfaces 32A, 32B which axially project from the end opposite the corresponding circumferential shoulders 30A, 30B. The axially bearing surfaces 32A, 32B are formed in the present embodiments as shoulders on the edge forming a circumferential continuation of the support or braking plate of the brake shoes as is customary. In the embodiment of FIGS. 1–9 there are two axial bearing surfaces 32A, 32B on each brake shoe.

According to a feature of the present invention each brake shoe thus comprises, in this embodiment, two laterally projecting shoulders or axial bearing surfaces facing each other on each end, namely, a shoulder 30A, 30B and an axial bearing surface 32A, 32B as viewed for one of the brake shoes in FIG. 9.

Figure 4:
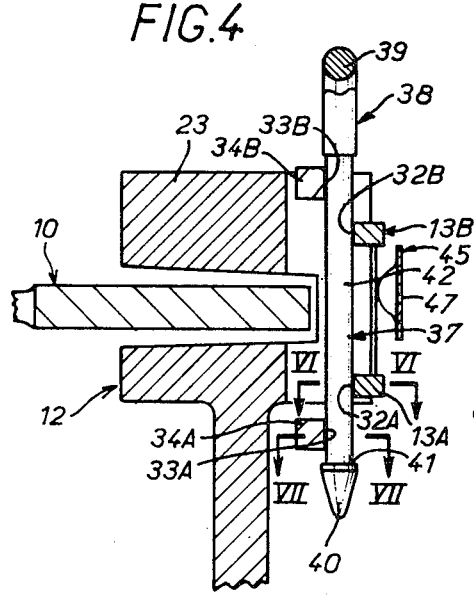

According to the invention axial bearing surfaces 33A, 33B are associated with the caliper member 14 for its axial retention, see FIGS. 2 and 4, which bearing surfaces face axial bearing surfaces 32A, 32B on the brake shoes 13A, 13B respectively and are disposed axially beyond the latter bearing surfaces relative to the intermediate portion 15 of the caliper member 14.

In the embodiment of FIGS. 1-9 there are two pairs of axial bearing surfaces 33A, 33B associated with the caliper member 14; these bearing surfaces are formed integrally with the caliper member on the edges of laterally projecting lugs 34A, 34B.

Further, in the embodiment the lugs 34A, 34B as well as the circumferential shoulders on the brake shoes on which the axial bearing surfaces 32A, 32B are formed are situated in recesses 35 defined in leg portions 23 of fixed support 12 on the side of the intermediate portion 15 of the caliper member 14.

In any event, according to the invention, a retaining pin 37 is removably received between the axial bearing surfaces 32A, 32B on the brake shoes 13A, 13B and the corresponding axial bearing surfaces 33A, 33B on the caliper member 14.

In the embodiment of FIGS. 1-9, two such retaining pins 37 are thus provided which are respectively disposed one to each side of the axial gripping plane P. The retaining pins 37 form two branches of the same part 38 which is U-shaped, FIG. 8; the intermediate portion 39 of the U-shaped part 38 interconnects the branches to each other and defines a handle portion.

In practice, the free end of each retaining pin 37 has a tapered or frustoconical tip 40 disposed beyond the transverse retaining shoulder 41. The retaining shoulder 41 delimits a connecting zone between a portion 42 of narrow diameter of the retaining pins themselves which cooperate with the axial bearing surfaces 32A, 32B on the brake shoes 13A, 13B and axial bearing surfaces 33A, 33B on the caliper member 14.

As is known per se, resilient means urge against the intermediate portion 15 of the caliper member on the side of the intermediate portion facing the braking member 10 for urging the caliper member 14 in a direction axially away from the braking member 10.

According to a feature of the invention the resilient means bear against the fixed support on each side of the caliper member 14.

In the illustrated embodiment the resilient means comprises a leaf spring 45 which bears in its central region 46 against the caliper member 14 and at its arm portions 47 against flats 48 on the leg portions of the fixed supports. The leaf springs are substantially perpendicular to the axial gripping plane P. The arm portions 47 of the leaf springs 45 have, as is conventional, opposite flats 48, rounded contours, FIG. 2.

Figure 5:
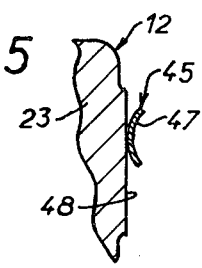
FIGS. 4 and 5 are other fragmentary sectional views taken along the lines IV—IV and V—V in FIG. 1.
Figure 6:
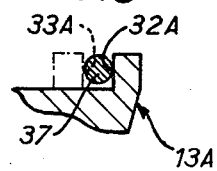
FIGS. 6 and 7 are fragmentary cross-sectional views, taken along the lines VI—VI and VII—VII, respectively, in FIG. 4.
Figure 7:
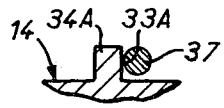
Figure 8:
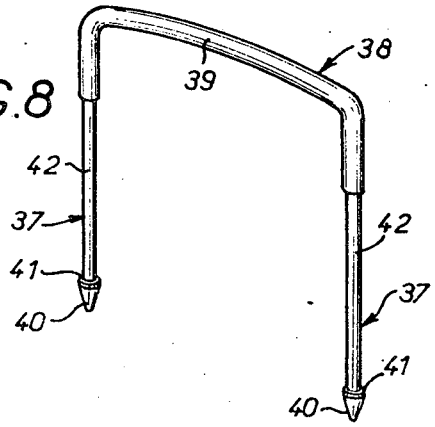
FIG. 8 is a perspective view of a retaining pin for use with the present brake.

According to the invention the leaf springs 45 also have, opposite the same flats 48 in a plane perpendicular thereto and parallel to the axial gripping plane P, rounded contours, FIG. 5.

Furthermore, in the embodiment of FIGS. 1-9, for improving the effectiveness of the leaf spring 45, the intermediate portion 15 of the caliper member 14 is slightly convex, FIG. 2, where it bears against the leaf spring, perpendicular to the gripping axis A. Correspondingly the leaf spring 45 has a complementary concave shape.

Finally the leaf spring 45 has at the middle of its central region 46 two tongues 49 formed by bulges, for example, and curved around into contact with a bore 50 at the middle of the intermediate portion 15 of the caliper member.

The brake according to the invention is assembled as described hereinafter.

After fixing the fixed support 12 to a supporting member, the brake shoes 13A, 13B are positioned on each side of the cylindrical braking member 10, and the caliper member 14 fitted with the leaf spring 45 is inserted radially into position straddling the end of the cylindrical braking member 10 and the brake shoes 13A, 13B. The caliper member 14 is inserted until the arm portions 47 of the leaf spring 45 abut against the flats 48 on the fixed support and is continued a sufficient distance so that it is possible to insert the retaining pins 37 between the axial bearing surfaces 32A, 32B of the brake shoes 13A, 13B and the axial bearing surfaces on the caliper member 14.

The retaining pins are advantageously inserted with one hand by grabbing the intermediate handle portion 39 of the U-shaped part 38, which is facilitated by the tapered tips 40 at the free ends fo the retaining pins.

Once the retaining pins 37 are in place the transverse shoulder 41 on each retaining pin 37 is located beyond the corresponding lug 34A on the caliper member 14, FIG. 4. The force exerted on the caliper member 14 may then be released.

The arm portions 47 of the leaf spring 45 bear against the fixed support 12 and the caliper member 14 is thus urged axially away from the cylindrical braking member 10. The lugs 13A, 34B on the caliper member 14 also urge the retaining pins 37 in the same direction and therefore, the brake shoes 13A, 13B, owing to the fact that the pins 37 are in contact with the axial bearing surfaces 32A, 32B on the brake shoes.

The reverse resilient movement of the sub-assembly made up of the caliper member 14, the retaining pins 37 and the brake shoes is arrested by the circumferential shoulders 30A, 30B of the brake shoes which abut against the axial abutment flat 31A, 31B on the fixed support.

Thus, axial retention of the caliper member 14 is effected by means of the brake shoes 13A, 13B which bear against the fixed support 12. Concomitantly, the retaining pins 37 are clamped between the axial bearing surfaces on the brake shoes 13A, 13B and those on the caliper member 14.

Any accidental withdrawal of the U-shaped part 38 is precluded by the shoulders 41 near the free ends of the retaining pins 37.

To gain access to the brake shoes 13A, 13B, e.g., for changing them because of wear, it is sufficient to push the caliper member 14 against the biasing force of the leaf spring 45, towards the braking member 10, and by grabbing the intermediate handle portion 39 of the U-shaped part 38 remove both retaining pins 37. The caliper member 14 is thereupon unfastened from the fixed support 12 and may be withdrawn axially therefrom, thereby affording access to the brake shoes 13A, 13B. It will be appreciated that the present invention provides easy and quick access to the brake shoes.

The actual operation of such a brake is, in itself, well known. Pressurized fluid is conveyed to the cylinder 18 of the actuating means and the associated piston 19 urges the brake shoes 13A against the braking member 10 and contemporaneously the caliper member 14 transmits the corresponding force to the other brake shoe 13B which is urged, in turn, against the braking member 10; the braking member 10 is thus gripped between brake shoes 13A, 13B arresting or slowing its rotation. When the pressure of the fluid is relaxed the braking member is released.

In the course of operation the caliper member 14 admits of radial displacements, guided by the leg portions 23 of the fixed support and the retaining pins 37.

In addition, because of the rounded contour at the ends of the arm portions 47 of the leaf spring 45 which are in contact with the flats 48 on the fixed support in a plane perpendicular to the flat 48 itself and parallel to the axial gripping plane P, as mentioned above, the caliper member 14 also admits of pivotal movement, if necessary, to follow or compensate any possible "coning" of the cylindrical braking member 10.

To facilitate such pivotal movement, according to an alternative embodiment illustrated in FIGS. 10–14, only one axial bearing surface 33 is associated with the caliper member 14 on each side of the axial gripping plane P.

Further, according to this embodiment there is associated, in a manner known per se, with the caliper member 14 a retaining bar 55 which extends substantially perpendicular to the axial gripping plane P having an intermediate portion 56 against which the face of the intermediate portion 15 of the caliper member 14 remote from the braking member 10 bears axially. The lateral branches 57 of the retaining bar 56 are provided at their ends opposite each other with turnover portions 58 substantially perpendicular to the axial gripping plane P. The intermediate portion 56 of the retaining bar 55 is provided with a rounded boss for contact with the caliper member 14.

The faces of the turnover portions 58 on the retaining bars which extends axially away from the braking member 10 is advantageously utilized for forming the axial bearing surface 33 associated with the caliper member 14. Accordingly, in this embodiment the axial bearing surface 33 is integrally formed with the retaining bar 55. In conjunction therewith the lateral arm portions of the leaf spring 45 are each divided into fingers 47A, 47B for receiving the lateral branches 57 of the retaining bar 55.

As will be noticed the turnover portions 58 of the lateral branches 57 of the retaining bar 55 are received in notches 59 in the fixed support for effecting radial holding of the retaining bar 55. The notches are formed on the face of the fixed support extending axially away from the braking member 10, FIGS. 11 and 14.

The alternative embodiment illustrated in FIGS. 15–18 associates the features described with reference to FIGS. 1–9 together with those of the embodiment of FIGS. 10–14.

Indeed, as in the embodiment of FIGS. 1–9, the caliper member 14 has laterally projecting lugs 34 on the edges of which are formed the axial bearing surfaces 33 and, as in the embodiment of FIGS. 10–14, there is only a single such lug and therefore only one axial bearing surface on each side of the axial gripping plane P.

Yet in the embodiment of FIGS. 15–18 in order to facilitate possible pivotal movement of the caliper member 14 the axial bearing surface 33 has a rounded contour for contact with the corresponding pin 27, parallel to the axial gripping plane P. The rounded contour takes the place of the rounded boss 62 usually provided on the retaining bar 55 for contact with the caliper member 14 as in the embodiment of FIGS. 10–14. In the preceding embodiments two retaining pins were provided.

In accordance with the embodiment of FIGS. 19–26 only one such retaining pin 37 is provided, which retaining pin extends substantially in the axial gripping plane P. In this case the corresponding axial bearing surface 32A, 32B of one of the brake shoes 13A, 14B is formed by the internal wall of a bore 63A, 63B in the brakes shoes 13A, 13B for engagement with the retaining pin 37.

In practice such a bore is formed in a lobe 64A, 64B in the backing or supporting plate of the brake shoes for supporting the friction lining, midway along the edge of the backing plates opposite the braking member 10.

In the embodiment illustrated in FIGS. 19–22, the lobes 64A, 64B provided on the brake shoes 13A, 13B are disposed inside the space bounded by the caliper member 14 between the braking member 10 and the face of the intermediate portion 15 of the caliper member axially facing the braking member 10.

In conjunction therewith the axial bearing surfaces of the caliper member 14 are formed by the internal wall of the bores 65A, 65B which are the continuation of one another in the limbs 17A, 17B of the caliper member for engagement with the retaining pin 37.

In this embodiment the radial maintenance of the retaining pin 37 is effected by a spring washer 66 which is resiliently received partly in a groove with straight flanks 67 in the caliper member 14 which constitutes a fixed housing therefor, and partly in a groove with inclined flanks 68 in the head 69 of the retaining pin 37, FIG. 21. Further, at the base of the head 69 on the retaining pin 37 there is a frustoconical bearing portion 70. For this reason, upon assembly, there is resilient expansion of the spring washer 66, then as the engagement is continued, the inclined flanks 68 of the head 69 come into position opposite the spring washer 66 and it returns to its initial configuration.

In order to facilitate the removal of the pin 37 by means of the blade of any kind of a hand tool, the head 69 pin 37 has a transversely extending slit 72.

Figure 24:
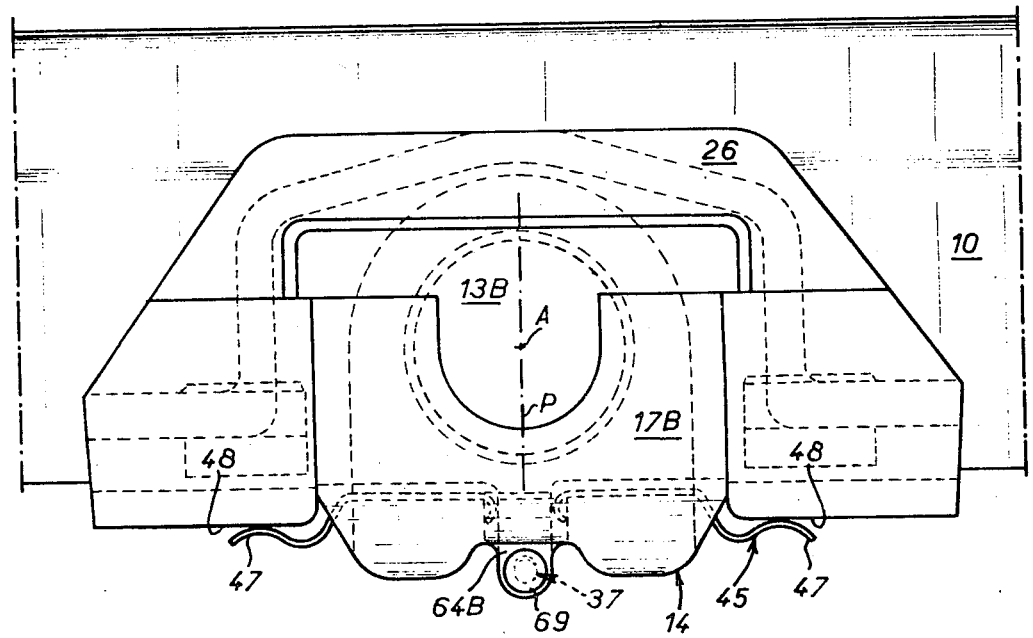
FIGS. 24 and 25 are view similar to those of FIGS. 20 and 21 for the embodiment of FIG. 23.
Figure 25:
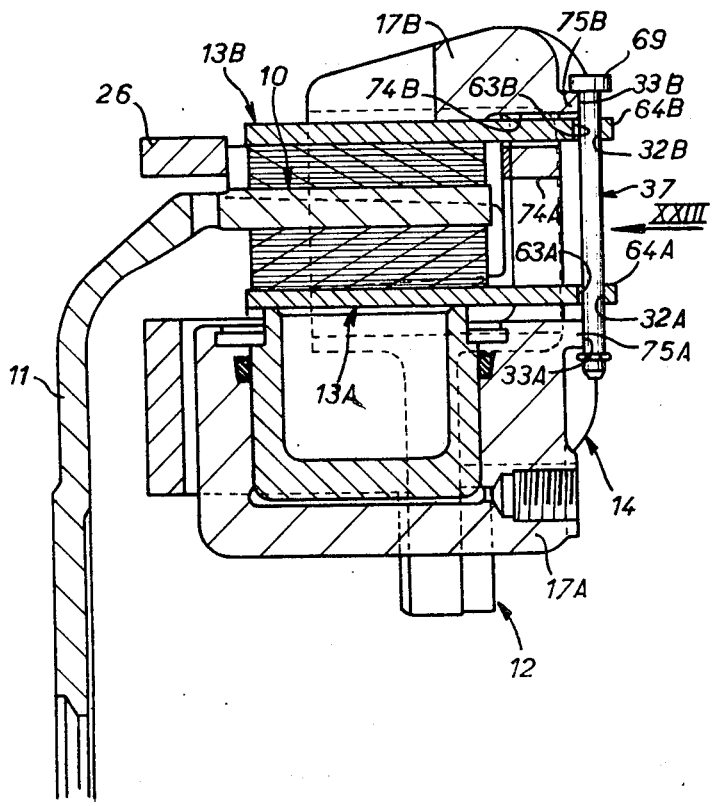

In the embodiment illustrated in FIGS. 23–25 the lobes 64A, 64B on the brake shoes 13a, 13B traverse the intermediate portion 15 of the caliper member 14 via cutouts 74A, 74B formed therein for this purpose and the retaining pin 37 is disposed on the face of the intermediate portion 15 of the caliper member 14 remote from the cylindrical braking member 10, or in other words, outside the space bounded by the caliper member 14.

In conjunction therewith the axial bearing surfaces 33A, 33B on the caliper member 14 are formed by the preferably rounded walls of the bosses 75A, 75B protruding from the face of the intermediate portion 15 remote from the cylindrical braking member 10, in the marginal zone of the corresponding cutouts 74A, 74B of the intermediate portion.

In the FIGS. 23–25 embodiment the radial maintenance of the pin 37 is insured as in the embodiments of FIGS. 1–18 by the transverse shoulder 41 belonging, however, to a spring washer 76 fitted on the corresponding end of the retaining pin 37.

In the embodiment illustrated in FIGS. 23–25, the arm portions 47 of the leaf spring 45 bear, as in the preceding embodiments, against the flats on the fixed support 12 which are perpendicular to the axial gripping plane P.

Figure 26:
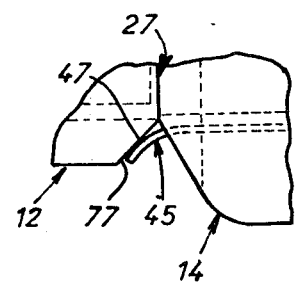
FIG. 26 is a detail of part of FIG. 24 according to a modified embodiment of the invention.

In the modified embodiment shown diagrammatically in FIG. 26, the arm portions (only one shown) bear against the flats 77 on the fixed support 12 which are planar, as above, but inclined relative to the axial gripping plane P.

As a result, the reaction force to which the leaf spring 45 is subjected through the fixed support 12 and which the leaf spring 45 transmits to the caliper member 14 comprises a component perpendicular to the axial gripping plane P so as to insure enhanced position stabilization of the caliper member in the central recess 27 in the fixed support 12.

The various alternative embodiments illustrated in FIGS. 10-26 comprise assembly, operational and accessibility features similar to features described above with respect to the first embodiment of FIGS. 1-9.

Moreover the present invention is not intended to be limited to these embodiments but encompasses all alternatives, modifications and expedients within the scope of the appended claims.

It is also to be noted that, in any case, for retaining pin or pins the axial bearing surface(s) with the caliper member 14 is (are) staggered along the pin relative to axial bearing surface provided on the brake shoes 13A, 13B.

Furthermore, the present invention is not limited to the case in which the caliper member 14 acts as an actuating member; as seen above the caliper member includes a cylinder in which the operating piston is movably mounted for cooperation with one of the brake shoes. Rather, the present invention covers cases in which the actuating means are entirely borne by the fixed support, the caliper member enclosing not only the brake shoes 13A, 13B and the braking member 10 but also the actuating means. The actuating means act against one of the brake shoes and the corresponding limb of the caliper member.

Likewise, the invention is not intended to be limited to the case in which each brake shoe is enclosed by the leg portions of the fixed support; each brake shoes is in the course of braking thrust against the lagging leg portion of the fixed support relative to the corresponding direction of rotation of the braking member. Rather, the invention covers the case where at least one of the brake shoes, or both, enclose the leg portions; during braking the brake shoe(s) is (are) retained by traction by the leading leg portion relative to the corresponding direction of rotation of the braking member.

What I claim is:

1. A brake of the type including a fixed support, a hollow generally cylindrical rotary braking member, a brake shoe disposed on each side of the cylindrical braking member, actuating means, a generally C-shaped caliper member shiftably mounted for radial movement relative to said braking member and straddling said braking member, said brake shoes and said actuating means, said caliper member comprising first and second limbs interconnected by an intermediate portion, said first limb associated with said actuating means for cooperation with a first said brake shoe and a second limb cooperate with a second said brake shoe, braking force being applied directly by said actuating means and through said caliper member for urging said brake shoes against said braking member along a gripping axis passing through their central zones and generally radially of said cylindrical braking member, and the improvement comprising two circumferential shoulders for axially retaining said caliper member laterally projecting from the end of one of said brake shoes axially remote from but facing said intermediate portion of said caliper member, said shoulders abutting against axial abutment flats provided on said fixed support, and an axial bearing surface relatively adjacent said intermediate portion of said caliper member and axially extending from the end of said one brake shoe remote from said circumferential shoulders, and an axial bearing surface associated with said caliper member axially adjacent the said axial bearing surface on said one brake shoe and disposed axially therebeyond relative to said intermediate portion of said caliper member, in combination with a retaining pin removable mounted between said axial bearing surfaces on said brake shoe and associated with said caliper member.

2. The brake according to claim 1, wherein resilient means bearing against one side of said intermediate portion of said caliper member facing said braking member urge said caliper member axially, and wherein said resilient means also bears against said fixed support, on each side of said caliper member.

3. The brake according to claim 2, wherein said resilient means bears against flats formed on said fixed support, which flats are planar and substantially perpendicular to an axial plane of said brake passing through said gripping axis.

4. The brake according to claim 2, wherein said resilient means bear against flats formed on said fixed support, which flats are planar and inclined relative to an axial plane passing through said gripping axis.

5. The brake according to claim 2, wherein said resilient means has arm portions bearing against said fixed support which in a plane parallel to an axial plane of said brake passing through said gripping axis have rounded contour surfaces facing said fixed support.

6. The brake according to claim 2, wherein said intermediate portion of said caliper member has a generally convex contour in contact with said resilient means perpendicular to said gripping axis and said resilient means has a contour generally complementary to the convex contour of said caliper member.

7. The brake according to claim 1, wherein two said axial bearing surfaces are associated with said caliper member for said retaining pin.

8. The brake according to claim 2, wherein a single said axial bearing surface is associated with said caliper member for said retaining pin.

9. The brake according to claim 1, wherein said axial bearing surface associated with said caliper member is integrally formed therewith.

10. The brake according to claim 8, and a retaining bar associated with said caliper member extending substantially perpendicular to the axial plane of said brake containing said gripping axis and including an intermediate portion against which said intermediate portion of said caliper member bears axially on its face remote from said braking member, and two lateral branches, wherein said axial bearing surface associated with said caliper member is integrally formed with said retaining bar.

11. The brake according to claim 10, at least one of said lateral branches of said retaining bar is provided with a turnover portion substantially perpendicular to the axial plane of the brake passing through said gripping axis, wherein said axial bearing surface associated with said retaining bar is defined by a face on said turnover portion axially remote from said braking member.

12. The brake according to claim 11, wherein said turnover portion on said one branch of said retaining bar is received in a notch in said fixed support on its face axially remote from said braking member.

13. The brake according to claim 1, wherein two said retaining pins are provided, disposed on opposite sides of an axial plane of said brake passing through said gripping axis.

14. The brake according to claim 13, wherein said retaining pins are connected together by a bow-shaped handle portion.

15. The brake according to claim 1, wherein a single said retaining pin is provided, disposed substantially along an axial plane containing said gripping axis.

16. The brake according to claim 1, wherein the axial bearing surface on said one brake shoe is formed by the internal wall of a bore in engagement with said retaining pin.

17. The brake according to claim 16, wherein said axial bearing surface associated with said caliper member is formed by the internal wall of a bore in one of said limbs for receiving said retaining pin.

18. The brake according to claim 16, said bore in said brake shoe is formed in a lobe on a backing plate thereof, wherein the lobe extends through the intermediate portion of said caliper member, said retaining pin facing the face of said intermediate portion axially adjacent said braking member.

19. The brake according to claim 18, wherein said axial bearing surface associated with said caliper member comprises a boss protruding from the face of said intermediate portion facing axially away from said braking member.

20. The brake according to claim 1, wherein a free end of said retaining pin comprises a frustoconical tip.

21. The brake according to claim 20, wherein the frustoconical tip on the free end of said retaining pin is disposed beyond a transverse retaining shoulder when said retaining pin is in its normal retaining position.

22. The brake according to claim 1, wherein said axial bearing surface associated with said caliper member is staggered along said retaining pin relative to plural said bearing surfaces on said brake shoes.

* * * * *